Sept. 5, 1939.    K. SCHINZEL    2,172,262
ULTRAVIOLET FILTER IN MULTILAYER FILM
Original Filed April 29, 1937
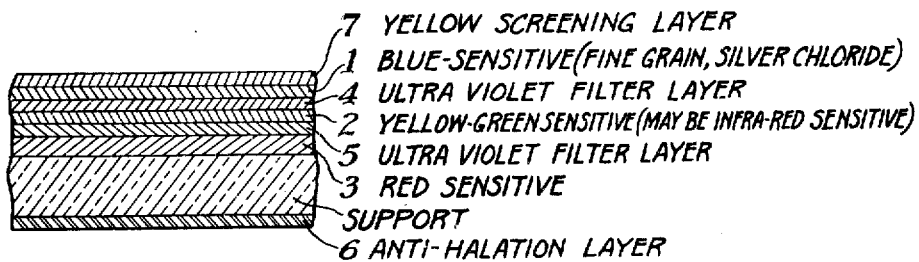
7 YELLOW SCREENING LAYER
1 BLUE-SENSITIVE (FINE GRAIN, SILVER CHLORIDE)
4 ULTRA VIOLET FILTER LAYER
2 YELLOW-GREEN SENSITIVE (MAY BE INFRA-RED SENSITIVE)
5 ULTRA VIOLET FILTER LAYER
3 RED SENSITIVE
SUPPORT
6 ANTI-HALATION LAYER
KARL SCHINZEL
INVENTOR
BY
ATTORNEYS

UNITED STATES PATENT OFFICE 2,172,262

ULTRAVIOLET FILTER IN MULTILAYER FILM

Karl Schinzel, Rochester, N. Y., assignor to Eastman Kodak Company, Rochester, N. Y., a corporation of New Jersey Original application April 29, 1937, Serial No. 139,759. Divided and this application August 9, 1938, Serial No. 223,947. In Austria May 9, 1936

3 Claims. (Cl. 95—2)

This invention relates to color photography, and particularly to filter layers for "monopack" film that is, film having differentially color sensitive layers permanently superposed on a single support.

In monopack film, the insertion of a yellow filter between the blue sensitive layer and the remaining red- and green-sensitive layers of the film is necessary because there is at present no other method for preventing action of blue light on the red-sensitive and green-sensitive emulsions. As pointed out below, the use of ultra-violet filter layers in monopack film is also desirable in certain cases. The processes in which such filter layers are useful are more fully described in my prior application, Serial No. 139,759, filed April 29, 1937, of which this application is a division.

In the accompanying drawing the figure is a sectional view of a multi-layer film having ultra-violet filter layers according to my invention.

If the filter dyes necessary for the division of the spectrum into three parts are added to the silver halide colloid layers, namely, yellow to the blue-sensitive layer, red-orange or green to the middle layer, the true color is to a certain degree affected, because regardless of the thinness of the layers formation of the latent image only in the upper part of each emulsion layer is permitted; this effect is, however, mainly noticeable in reversal development, in primary three-color development and three-color redevelopment. The desirable filter action can also be attained by correspondingly increasing the amount of sensitizer, but only with those which in greater concentration do not cause excessive loss of color sensitivity. Strongly swelling gelatine should be used for the emulsions in order to prevent overlapping of the color reactions from one emulsition to another.

The use of intermediate layers as color filters is recommended because strongly swelling gelatine layers between the silver halide emulsion layers appear desirable for reasons of development-technique. It is usually sufficient to color the gelatine layer adjacent to the blue-sensitive emulsion yellow, or also the blue-sensitive emulsion itself. The other intermediate gelatine layer, if it is present at all, may remain colorless or may also be colored yellow instead of red or green.

The whole triple layer with one or two intermediate layers, or without them, may also be colored yellow throughout; most simply, by subsequent bathing in dye solutions. Bathing need only be done for such a time as is required to color the blue-sensitive and the adjacent layer sufficiently for complete absorption of all the blue. With partial or complete yellow coloring it is of course, essential that the red sensitizer sensitize exclusively for red and red-orange with a distinct minimum in the yellow and green region of the spectrum or entirely without effect in that region, because yellow and green-yellow rays can then penetrate to the lower, usually red-sensitive layer. The yellow dye must in no way effect the sensitivity. In the relatively easily prepared and completely yellow colored triple layer the middle emulsion is protected from the action of blue light on both sides by yellow filters or yellow coloring of the adjacent silver halide emulsions which is desirable if blue light is to be used for the exposure of regenerated or residual silver halide.

The middle silver halide layer 2 (Fig. 1) may also be surrounded by filter or emulsion layers 4D and 5 absorbing ultra-violet and containing colorless or correctly colored filter-substances absorbing ultra-violet, perhaps in addition to the usual filter dye. A yellow filter layer under or over, or yellow coloring of, the blue-sensitive emulsion is essential for reasons stated before, so that only a layer absorbing ultra-violet between the middle and lower layer is used.

The triple layer with yellow colored blue-sensitive emulsion or with a special yellow filter layer, or both, or an additional intermediate and colorless gelatine layer, may also be treated after coating in a solution of the substance absorbing ultra-violet. If the present division of the spectrum into three regions is adopted, the amount of filter dye or the intensity of the coloring in all the variations previously described must be adjusted so that as little as possible or no blue light at all reaches the middle layer during exposure.

If the triple layer contains at least one yellow filter layer or a yellow-dyed blue-sensitive silver halide emulsion layer, bathing of the remaining layers in yellow, red or orange dye solutions or in solutions absorbing the ultra-violet may be done after development; the same is true for changing of the color of yellow and red filter dyes, as with indicators, by the action of acids or bases in order to make the next lower layer of silver halide accessible to another kind of light to which it is sensitive.

From the preceding it appears that diffusion of the yellow filter dye into the adjacent layers is perhaps without special detriment, but is best avoided in the interest of as true reproduction as possible; the red filter dye must, however, be water-insoluble or non-diffusing. Filter dyes which are insoluble in themselves and strongly colored substances, but readily soluble in sodium carbonate, alkalies or acids, are most suited. They are added to the gelatine in a highly dispersed state or are precipitated in it. Water-soluble dyes are added to the layers in form of insoluble salts or precipitated in the gelatine solution as such. Coloring of the filter layers with water-soluble, substantive and high-colloidal dyes is also satisfactory without conversion into the insoluble dye salt. Slight diffusion of the dye is harmless, unless it is capable of sensitizing or reducing the sensitivity.

Solution or destruction of the substances absorbing ultra-violet is necessary only, if fluorescence is too disturbing in the finished color pictures, or if they discolor on prolonged exposure to light. In the selection of genuine filter dyes, one must take into consideration that they should be readily washed out or converted into colorless compounds at the end of the color process by means of acids or bases, oxidizing or reducing agents, or by other suitable reagents. Sometimes, this becomes necessary in an earlier stage of the process in order to make the silver halide layer protected by the filter susceptible to blue light, in some cases, after preliminary bleaching of the silver image situated above it.

An absorbing filter 7 (Fig. 1) may be arranged above the upper blue-sensitive emulsion. This filter may consist of a yellow colored colloid soluble in water or sodium carbonate, as dextrine or gum arabic, stearic acid etc. A layer of colloidal silver 6 (Fig. 1) in any emulsifying agent permeable to water may serve an antihalation protection on either side of the base.

*Substances absorbing ultra-violet.*—Suitable substances are aesculine, quinine, anethol, triphenylmethane, cumarone, acetaminoquinoline, hydroxy-quinoline sulfonic acids, hydroxy-naphthoic acids, naphthol-sulfonic acids, naphthylamine sulfonic acids and the analogous substitution products of anthracene, as well as many others known from the literature, or their insoluble salts, esters, anilides and other derivatives.

The following examples illustrate the practical application of the principles of three-color reversal development as explained in the preceding paragraphs, reference being made particularly to Fig. 1 by way of example.

In the absence of filter layers and with sensitization of the lower layer 3 exclusively for red or also orange or infra-red, the initially reduced silver could be, as also in other cases, converted into silver ferrocyanide which is no more developable or only extremely slowly so with suitable color developers, or into highly dispersed silver iodide, or into any other colorless silver salts which is insoluble, and difficultly reduced, preferably soluble in hypo, and decomposed by alkali or acid or the metallic silver can be completely dissolved by oxidizing agents and washed out. Here and in analogous cases discussed later it is sufficient, if at least the highly dispersed silver of the upper layer 1 and, totally or partially also the fine-grain silver of the middle layer 2 is converted in this manner. Waiting is then not necessary (and this is a characterizing point of the present invention), until also the coarser negative silver of the lower layer 3 is converted or dissolved, since exposure of the residual silver halide of the middle layer 2 is best done from above. The residual silver halide of the middle layer 2 is then exposed to yellow or green light from either side and developed purple. After this, the silver halide of the lower layer 3 is exposed to red light through the support S and developed green-blue. Finally, the residual silver halide of the upper layer 1 is exposed to blue or ultra-violet light and developed yellow. A variant of this procedure would be to re-expose the lower layer 3 first to red light and develop green-blue, then re-expose the middle layer to yellow light from above, etc. In all these variants it is assumed that the sensitizers of the middle and lower layers are stable to mild oxidizing agents acting on metallic silver. This condition can best be fulfilled by the presence of highly dispersed silver, as it exists in the highly sensitized grainless or very fine-grain silver halide emulsions of the upper or also middle layer. The color sensitivity can, however, be partially restored by dilute solutions of sulfite, bisulfite, hydrazine sulfate etc., unless addition of these agents with bleaching of the dye already formed does not take place.

The lower layer 3 can also be exposed to red light directly after primary general development and its residual silver halide developed green-blue, and only then all silver which was previously reduced, or at least the highly dispersed silver of the upper layer (or partially, also, the fine-grain silver of the middle layer), removed or preferably converted into silver ferrocyanide or the compounds mentioned above. The middle layer 2 alone is then exposed to yellow light from above and developed purple, then the upper layer is exposed to blue light and developed yellow. The exposure of the middle layer 2 to green light from below, or to blue light from below in the case of a yellow filter layer 4 between the top two layers, can be less satisfactorily accomplished by exposing in either case after preliminary reduction of the green blue dye formed in the lower layer 3 to its easily reoxidized insoluble leuco-forms. Reduction of the residual silver halide of the upper layer 1 may be effected here, as in similar cases, by alkaline solution of the leuco-forms of various yellow vat dyes, best under exclusion of atmospheric oxygen to prevent fog. Oxidation stability of the red sensitizer, which may here be also sensitive to yellow, is no more required, which represents a very great advantage compared to the method of execution previously described, because the choice of proper red sensitizers is much less limited, and many may be used which excel by complete insolubility or inability to diffuse. Under certain circumstances, even oxidation-stability of the sensitizer of the middle layer is unnecessary, as proven by the following examples:

The residual silver halide of the middle layer 2 can be exposed also to blue light through the support S, if sufficient blue sensitivity of the upper layer 1 was obtained by high sensitization which is then lost during conversion by oxidation of the primarily reduced silver, since here the undesirable effect of the very little sensitive upper layer is not feared. The hardly noticeable difference conditioned by the lower blue (or purple) image can be corrected by creating a blue (or purple) indo-phenol or azo-methine dye in addition to the silver in the first general development which, however, in contrast to the final image dye of the lower layer (indigo, Russig's dye, seleno indigo, etc.) is easily split by acid. After making the residual silver halide of the middle layer 2 developable with blue light through this lower layer now uniformly colored, the intermediate dye of the lower layer is destroyed. This may also be done after completion of the three-color image, if also the final yellow dye of the upper part image is stable to acid.

As a further example, the middle layer 2 is exposed to yellow light from either side and developed purple, then the upper layer 1 is exposed to blue light and developed yellow, finally the lower layer 3 to blue, white or red light and developed green-blue after removal or conversion of the primarily reduced silver, if there is a yellow filter layer 4 between the middle and upper layer or if the latter is colored yellow and the yellow-green sensitizer alone is oxidation-stable. The lower layer 3 can also first be exposed to red light and developed green-blue, then the upper layer 1 to blue light and developed yellow, or in reverse order; after short action of potassium ferricyanide or suitable solvents on the newly reduced, highly dispersed silver of the upper layer, the middle layer 2 is made developable with yellow light and developed to the purple part image. It would be less correct to expose to red light the residual silver halide of the lower layer 3 after general black development and to develop green-blue, that of the upper layer to blue and to develop yellow, or in reverse order, and then only to convert all silver, or at least that of the upper layer, into silver ferrocyanide or to dissolve it, and finally to expose the middle layer 2 to yellow and to develop purple.

The stability of the green-yellow sensitizer to oxidation is not absolutely necessary for the middle layer 2, if at least the yellow filter layer 4 which also absorbs ultra-violet, or yellow coloring of the upper layer is present, so that in the triple layer, according to the present invention, one can entirely dispense with oxidation-stable sensitizers and pay more attention to prevention of diffusion of sensitizers from one layer to the other. The lower layer 3 is exposed to red light after general black development and is developed green-blue and treated further according to one of the following methods:

It would be simplest to expose the middle layer to ultra-violet light through the lower uniformly blackened layer and through the green-blue dye not absorbing ultra-violet or to infrared light, if it was also sensitized for this in addition to green-yellow, and to develop purple. This requires long exposure, however, since the lower layer absorbs most of the light. Even in exposure of the upper layer to blue light, because the primarily reduced silver prevents a complete exposure through the depth of the upper layer, some residual silver halide will be left and developed in the color of the middle layer, if this is developed later. By the use of ultra-violet light for exposure of the residual silver halide of the upper layer this evil is eliminated, according to the invention. The same effect is gained with soft X-rays, if the upper part image is produced last.

It is, however, better first to expose the upper layer to ultra-violet light and develop a yellow image. Alternatively it may be treated briefly with a 1 to 2% solution of potassium ferricyanide or with a silver solvent converting or dissolving only the highly dispersed silver of the upper layer entirely or partially into white silver ferrocyanide, without allowing this to take place in the other two layers. The residual silver halide of the upper layer is then converted into a yellow image. The lowest layer is then exposed to red light and developed to blue-green. If two filter layers 4 and 5 are provided a yellow and a red or orange one, or two yellow layers, exposure of the residual silver halide of the lower layer can be done even with blue light. The middle purple part image is then obtained by one of the following methods:

(a) The residual silver halide of the middle layer is made developable by pre-treatment with about 0.02% solution of thiourea, thiosinamine etc., or analogously acting sulfur derivatives, or with a 0.001% solution of zinc chloride, by means of arsenite, hypophosphite, thallo salt, triamido phenol, masking dyes, especially in the presence of heavy metal salts or other suitable agents, which may also be added to the corresponding color developers; it is then developed purple, and finally all silver removed or fixed out. The pre-treatment may be omitted, if a color developer is chosen which acts so vigorously on addition of ammonia or alkali, or also alcohol and acetone, preferably without air, that the residual silver halide of the middle layer is reduced without exposure after prolonged treatment. This is especially true for a silver chloride emulsion layer which, unexposed, is sufficiently stable to the color developers containing soda which is necessary for the two outer layers. The residual silver bromide of the middle layer is, however, reduced without pre-treatment or exposure by most leuco-vat dyes in alkaline solution or one containing alcohol or acetone with precipitation of the dye on the image. Residues of the latent images in the other two layers can be destroyed previously by the action of mild oxidizing agents, as potassium ferricyanide and ammonia etc.

(b) All previously reduced silver is removed entirely or for the largest part, combining with it possibly the destruction of filter dyes by oxidation or acid, or converting into ferrocyanide etc., exposing the residual silver halide of the middle layer from both sides to white, or better, ultra-violet light or to soft X-rays and developing purple, and finally, removing the silver and fixing out, if necessary, both of which are possible with Farmer's reducer. The residual silver bromide can also be reduced to black silver with vigorous ordinary developer or with any organic or inorganic reducing agent; this is then converted into very easily oxidizable highly dispersed silver chloride by bichloride of mercury with the color developers even without exposure.

(c) The residual silver halide of the middle layer is at once made developable by exposure from above or from both sides to ultra-violet light or better soft X-rays, and the corresponding part image is developed. This is possible, because very fine-grain and not cohering reduced silver is very transparent to ultra-violet light. The silver is then removed.

(d) The residual silver bromide of the middle layer is converted into silver iodide or one of its complex salts, if necessary, after removal of metallic silver, and this is colored purple or green-blue by mordanting dyes. The metallic silver is removed now or earlier and fixed, if necessary. The dyes are made insoluble before removal of the mordanting agent by proper precipitants, phosphotungstate etc. If the middle layer consists of silver chloride, its residue can be converted into silver ferrocyanide, and further into red nickel-dimethylglyoxime or into yellow titanium ferrocyanide which latter yields a green-blue image with blue basic dyes. The silver ferrocyanide originating from the silver chloride, can also be converted into other suitable non-tanning mordanting bodies which are colored purple or green-blue by basic dyes and may be removed after insolubilization of the dyes in order to attain greater transparency.

The procedures just described and particularly the processing of the lower layer prior to the middle layer are based in the assumption that the sensitizers are not stable to oxidation. Stability to the developer is not necessarily assumed. If, however, at least the yellow-green sensitizer of the middle layer is stable to development and oxidation, all metallic silver of the three layers can be removed immediately after the usual development or it may be converted into silver ferrocyanide. The middle layer can then be exposed from above, or if the lower filter layer is orange, from below or from both sides to yellow light and developed purple; after this, the residual silver halides of the two other layers are exposed to blue light and developed to the appropriate colors in succession. Less complete results are obtained, if the residual silver halide of the middle layer is first exposed from above to yellow green light and made developable, then, in order, the two outer layers to blue light, or only one of them in this manner and the other made developable with thiourea, etc., in a preliminary bath or as addition to the developer. If the sensitizers of both lower layers are stable to developer, the residual silver halide of the lower layer can also be made developable by red light and converted into the green-blue part color image first, then the middle layer exposed from above to yellow light and developed purple, and finally the upper layer exposed to blue light and developed yellow. It is, however, more desirable to make the middle part color image according to the methods described before.

Stability of the sensitizers to developer and oxidation agents is not absolutely required, even with intermediate filter layers absorbing ultra-violet, as can be seen from the following examples:

If a colorless or yellow-colored layer not transmitting ultra-violet is situated between the upper and middle silver halide emulsion layers, the lower layer is first exposed to red light after general development and developed in color; then follows exposure from above with ultraviolet light, and the upper silver bromide or silver chloride layer is developed yellow; after this, the middle layer is made developable, according to the above-described methods by intense ultra-violet exposure from the back or better with thiourea, etc., and the corresponding part color image is developed. If a yellow filter is on the top and one absorbing ultra-violet between the lower and middle layers, the lower layer is exposed to ultra-violet light and developed green-blue; then, after one of the abovementioned methods, the upper and middle layers are treated, one of them consisting of silver chloride, and the corresponding part color images developed.

If two ultra-violet filter layers are arranged on both sides of the middle silver halide layer 4D (Fig. 1), the outer layer 1 is first exposed to ultra-violet light and colored, then the lower layer 3, and then with intensive exposure from both sides to soft X-rays or ultra-violet light (if necessary, after removal or destruction of the substance absorbing ultra-violet), or better by treatment with thiourea, etc., the middle layer 2 is made developable and developed in color; finally, all silver and remaining unused salt is removed. The upper layer absorbing ultra-violet can also be colored yellow, for example, by using nitroso-dimethyl-aniline. The middle layer can, of course, be made developable by white or colored light, according to the sensitivity of the layer after removing the silver of both other layers or converting it into ferrocyanide, etc. If it was sensitized for infrared, it is exposed to these rays which readily penetrate the dyes present in the two other layers.

If a layer 4D absorbing ultra-violet exists between the upper and middle layers, an orange filter layer between middle and lower silver halide layers, the lower part image can be obtained with blue light and the upper one with ultra-violet light, or vice-versa, and the middle one according to one of the methods described before.

If an ultra-violet-absorbing filter layer is between the middle and lower silver halide layers, a yellow filter between middle and upper layers, the lower layer is exposed to ultra-violet rays, the upper to blue light, perhaps, after preliminary conversion of the highly dispersed silver of the same into silver ferrocyanide, etc. The ultra-violet-absorbing substances can, of course, also be added to upper and lower sensitive emulsion layer instead of an intermediate layer.

Exposure through the back in all previous cases may be somewhat prolonged, since ultra-violet light is partially absorbed by pyroxylin, unless a very thin film or one of material permeable to ultra-violet, such as cellulose acetate or Cellophane, is used.

Since silver bromide must withstand four developments, three of them with color developers containing sulfite-free sodium carbonate or alkali, in order to obtain vigorous part images, fog is difficult to avoid. It is, therefore, recommended to use an upper or middle silver chloride layer, especially with film coated on both sides, where the film itself or a coated filter layer can contain colorless substances absorbing ultra-violet and the red-sensitive silver halide layer is alone on one side, because silver chloride is colored, even if it is not exposed, and still more so unexposed silver bromide. Colored development of the original residual silvery chloride can be even entirely dispensed with, since it is easily converted into silver ferrocyanide and this into colored substances, or easily colored mordanting bodies. One is not dependent upon the easy reducing ability of silver chloride at all, if the residual silver chloride is only temporarily converted into silver ferrocyanide after first general black development, according to the invention. After colored development of the two other layers, it is reconverted into silver chloride or silver bromide, or less desirably, into silver iodide, which can also be effected by addition of potassium bromide, etc. to the last color developer. The residual silver ferrocyanide could also be reduced with a vigorous color developer directly, or with formation of the color image from silver iodide which is readily obtained from the residual silver chloride.

Other developing methods may be used with films having ultra-violet filter layers, as described in my prior application Serial No. 139,759.

Having thus described my invention, what I claim as new and desire to be secured by Letters Patent is:

1. A photographic element for use in color photography and comprising a support and three gelatino-silver halide emulsion layers carried thereby, the layers being differentially color sensitive and substantially colorless filter layers absorbent of ultra violet between the middle layer and each of the other two layers, said ultra-violet filter layers being insoluble in ordinary photographic baths.

2. A photographic element for use in color photography and comprising a support and three gelatino-silver halide emulsion layers carried thereby, the layers being differentially color sensitive to blue, green-yellow and red, and substantially colorless filter layers absorbent of ultra violet between the middle layer and each of the other two layers, said ultra-violet filter layers being insoluble in ordinary photographic baths.

3. A photographic element for use in color photography and comprising a support and three gelatino-silver halide emulsion layers carried thereby, the layers being consecutively and differentialy color sensitive to blue, green-yellow and red, there being a layer absorbent of blue light in front of the green-yellow and red layers and there being substantially colorless layers absorbent of ultra violet light on each side of the middle, green-yellow sensitive layer, said ultra-violet filter layers being insoluble in ordinary photographic baths.

KARL SCHINZEL.

---

CERTIFICATE OF CORRECTION.

Patent No. 2,172,262.     September 5, 1939.

KARL SCHINZEL.

It is hereby certified that error appears in the printed specification of the above numbered patent requiring correction as follows: Page 1, second column, line 17, for "eposure" read exposure; page 4, first column, line 28, for "in order" read in any order; and that the said Letters Patent should be read with this correction therein that the same may conform to the record of the case in the Patent Office.

Signed and sealed this 2nd day of January, A. D. 1940.

Henry Van Arsdale,
Acting Commissioner of Patents.

(Seal)

photography and comprising a support and three gelatino-silver halide emulsion layers carried thereby, the layers being differentially color sensitive and substantially colorless filter layers absorbent of ultra violet between the middle layer and each of the other two layers, said ultra-violet filter layers being insoluble in ordinary photographic baths.

2. A photographic element for use in color photography and comprising a support and three gelatino-silver halide emulsion layers carried thereby, the layers being differentially color sensitive to blue, green-yellow and red, and substantially colorless filter layers absorbent of ultra violet between the middle layer and each of the other two layers, said ultra-violet filter layers being insoluble in ordinary photographic baths.

3. A photographic element for use in color photography and comprising a support and three gelatino-silver halide emulsion layers carried thereby, the layers being consecutively and differentialy color sensitive to blue, green-yellow and red, there being a layer absorbent of blue light in front of the green-yellow and red layers and there being substantially colorless layers absorbent of ultra violet light on each side of the middle, green-yellow sensitive layer, said ultra-violet filter layers being insoluble in ordinary photographic baths.

KARL SCHINZEL.

---

CERTIFICATE OF CORRECTION.

Patent No. 2,172,262.  September 5, 1939.

KARL SCHINZEL.

It is hereby certified that error appears in the printed specification of the above numbered patent requiring correction as follows: Page 1, second column, line 17, for "eposure" read exposure; page 4, first column, line 28, for "in order" read in any order; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.